United States Patent
Schramm

[11] Patent Number: 5,931,378
[45] Date of Patent: Aug. 3, 1999

[54] OPERATING SYSTEM FOR A MOTOR VEHICLE AUTOMATIC AIR-CONDITIONING SYSTEM

[75] Inventor: Michael Schramm, Neustadt, Germany

[73] Assignee: Valeo Klimasysteme GmbH, Rodach, Germany

[21] Appl. No.: 08/913,983

[22] PCT Filed: Mar. 15, 1996

[86] PCT No.: PCT/EP96/01119
§ 371 Date: Jan. 8, 1998
§ 102(e) Date: Jan. 8, 1998

[87] PCT Pub. No.: WO96/30225
PCT Pub. Date: Oct. 3, 1996

[30] Foreign Application Priority Data

Mar. 31, 1995 [DE] Germany ............... 295 05 606 U

[51] Int. Cl.⁶ ............... B60H 1/00; G05G 1/28
[52] U.S. Cl. ............... 236/94; 62/127; 165/11.1
[58] Field of Search .............. 236/94, 49.3; 62/126, 62/127, 161, 163, 244, 125; 165/42, 43, 202, 203, 204, 11.1; 454/75

[56] References Cited

U.S. PATENT DOCUMENTS

| | | | |
|---|---|---|---|
| 4,951,476 | 8/1990 | Yamamoto et al. | 454/75 X |
| 5,070,931 | 12/1991 | Kalthoff et al. | 62/127 X |
| 5,220,805 | 6/1993 | Fukudomi | 62/126 |
| 5,230,467 | 7/1993 | Kubsch et al. | 62/127 X |

FOREIGN PATENT DOCUMENTS

| | | |
|---|---|---|
| 0 414 948 | 3/1991 | European Pat. Off. . |
| 0 605 324 | 7/1994 | European Pat. Off. . |
| 39 14627 | 11/1989 | Germany . |

Primary Examiner—Harry B. Tanner
Attorney, Agent, or Firm—Morgan & Finnegan

[57] ABSTRACT

The invention concerns a control unit for an automatic air-conditioning system for motor vehicles, with adjusting and/or indicating means at least for "air distribution", "air volume" and "air temperature" with the following features:

(a) As nominal-value adjusting means for "air distribution" and/or "air volume" and/or "air temperature", provision is made in each case for an operator-regulated analog nominal-value adjusting device (2, 3 and 4, respectively);

(b) as nominal-value indicating means for "air distribution" and/or "air volume", an analog nominal-value indicating device (2.1; 2.2 or 2.1; 2.3 or 2.1; 2.4 or 3.1; 3.2) is associated with each nominal-value adjusting device (2 or 3), such indicating device being directly slaved by an independent separate drive;

(c) the nominal-value indicating device in the manual adjustment mode is, in the automatic mode, concomitantly used in each case as an actual-value indicating device for "air distribution" and/or "air volume", such actual-value indicating device being directly slaved by the separate drive in accordance with the given actual value.

20 Claims, 2 Drawing Sheets

OPERATING SYSTEM FOR A MOTOR VEHICLE AUTOMATIC AIR-CONDITIONING SYSTEM

BACKGROUND OF THE INVENTION

The invention relates to a control unit for an automatic air-conditioning system for motor vehicles according to patent claim 1.

BRIEF SUMMARY OF THE INVENTION

A control unit for an automatic air-conditioning system for motor vehicles is known, for example from DE 39 146 27. Said control unit contains two rotatable, coaxial control knobs projecting externally from the housing, as well as two coaxial shafts, an inner and an outer shaft, which are rotatably connected with the two control knobs. The temperature and the distribution of air in the interior of the motor vehicle are adjusted by way of said shafts. As another feature, the control unit comprises two indicator drums, which are rotatably connected with the two shafts, arranged in the interior of the control unit, and provided with symbols, which shift in relation to two windows in the front wall of the housing. Furthermore, when adjusted, the two control knobs lock in stable, exactly defined angular positions.

Furthermore, a control unit for an automatic air-conditioning system is known from U.S. Pat. No. 5,220,805, where the usual parameters of an air-conditioning system such as, for example "air distribution", "air volume" and "air temperature" are adjusted via infinitely rotatable control knobs. With this control unit, the set point positions in the manual mode are indicated by digitally controlled symbols. When the control knob is turned, trailing of the digital symbols is accomplished by means of computer control, which determines the change in the desired parameter of the air-conditioning system from the original position, the sense of rotation, and the extent of rotation. When the parameter of the air-conditioning system is changed by manually overriding the automatic control by turning the knob, it is perceived as disadvantageous—due to the computer control—that the change takes place only in discrete, digitizable steps. Simple and safe adjustment of the desired parameter is prevented due to coarse digitization.

With other known designs of air-conditioning systems, it is possible, for example to override the automatic control by hand by manually actuating a great number of pushbuttons, or by actuating rocker keys a number of times for adjusting the speed of the blower and thus the value for air volume. The values so set by hand in the override function are indicated via LCD-displays. Provision is made for similar displays for indicating the actual value selected by the automatic system when operating in the purely automatic mode.

According to the problem of the present invention, the objective is to design possibilities for setting and recognizing manually adjustable values for "air distribution", "air volume" and, if necessary, "air temperature" in a simpler and safer way.

According to the invention, the solution to said problem is implemented by a control unit with the features of claim 1. Advantageous developments of the invention are the objects of the dependent claims.

In the embodiment of the control unit according to the invention, which has modes for both automatic and manual adjustment, provision is made for manually adjustable analog setting devices to regulate "air distribution" and/or "air volume" and/or "air temperature", permitting simple manual handling of such adjustments. As indicators of "air distribution" and/or "air volume" each analog setting device is associated with an analog display which in the manual setting mode acts as a direct analog indicator of the nominal value, activated by an independent outside drive, consistent with the preset nominal value, thereby affording quick and dependable read-out of the preset value. When switching to the automatic mode by actuating an "Automatic" pushbutton, such independent separate drive causes the indicator device to directly slave the given actual value of "air distribution" and/or "air volume" analogously, serving as an indicator for the actual value. In this way, the indicator previously used in the manual mode as a nominal value display can be concomitantly used in the automatic mode as an indication of the actual value.

To achieve simple and safe adjustments and read-outs, on the one hand, and a compact design of the device setting the nominal value, on the other, provision is usefully made in each case for a control knob surrounded concentrically over at least a portion of its circumference by a scale dial for the indicators of nominal or actual values. According to a preferred development of the invention, provision is made for slave indicators of nominal-value and actual-value of "air distribution" and/or "air volume", with the help of a separate drive, whereas a slave indication is omitted for the temperature setting controls. In a particularly compact embodiment, provision is made as a temperature-setting means for a ring concentric with the control knob for "air distribution" and/or "air volume" preferably at least with a control knob for "air distribution" particularly in the form of an outer ring having a stationary, annular dial scale associated with it.

BRIEF DESCRIPTION OF THE DRAWINGS

The invention and other advantageous developments of the invention according to the features of dependent claims are explained in greater detail in the following exemplified embodiments shown schematically in the drawing in which:

DETAILED DESCRIPTION OF THE INVENTION

Figure 1:
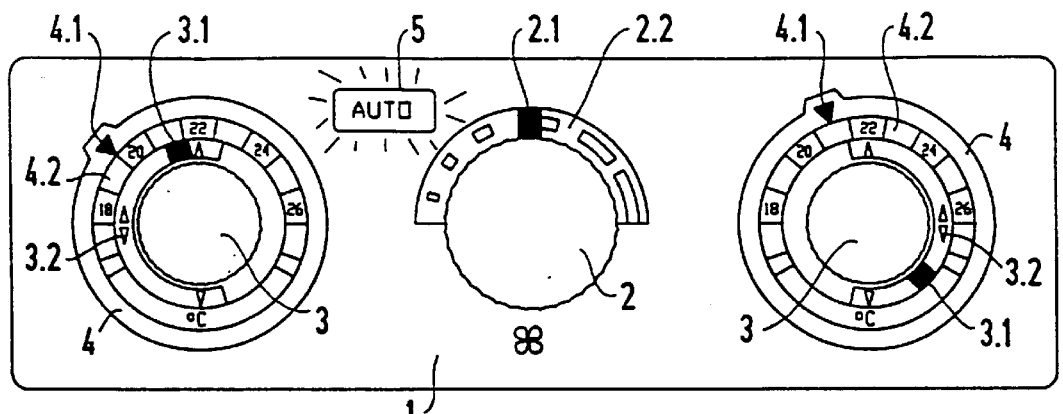
FIG. 1 shows a view of the face plate of a first embodiment of a control unit according to the invention.

FIG. 1 shows a top view of the face plate of a control unit of an automatic air-conditioning system for motor vehicles, with manual adjusting means in override function for overriding the automatic mode in the form of a center control knob 2 for adjusting the "air volume" by changing the speed of the blower; with a left control knob 3 and a right control knob 3 for "air distribution" to the left and, respectively, to the right half of the vehicle; as well as a rotary ring 4 for adjusting the "air temperature". As the nominal value indicator in the manual adjustment mode, and the actual-value indicator mode in the automatic mode, provision is made according to FIG. 1 for the indicator 2.1 slaved by a separate drive, for control knob 2 setting "air volume", and the indicator 3.1 for control knob 3 regulating "air distribution", whereby indicators 2.1 and 3.1 are guided along the fixed indicator dials 2.2 and 3.2, respectively, arranged, for example as transparent displays in front of the indicator dials. A suitably controlled stepping motor drive is advantageously used for independently driving the indicators, which are slaving without mechanical connection to the control knobs, especially for fully rotatable adjustment and indication range over 360°. In lieu of a stepping motor, provision can be made, for example for a rotary coil instrument, for a particularly economical design The automatic function of the air-conditioning system is dependent in terms of switch-off upon manual actuation of the nominal-value adjusting means in the form of control knobs 2 and 3 for "air volume" by changing the speed of the blower of the air fan, and, respectively, for "air distribution". Following prior manual actuation of the nominal-value adjusting means in the form of control knobs 2 and 3, the automatic mode can be switched on again at any time by actuating an automatic switch-on means particularly in the form of a pushbutton 5. The latter can be arranged either as a separate component in the front panel of control unit 1 as shown in FIG. 1, or can be integrated with at least one of control knobs 2 and 3 to obtain a particularly high degree of compactness, such integration being accomplished by arranging it radially inside control knob 3 for "air distribution" so as to be axially movable.

In automatic mode, the given actual value is displayed by the indicator in accordance with the automatic setting. Now, if the device for manual adjustment, in particular in the form of control knobs 2 and 3 is turned in either direction, the automatic system is switched off by the control unit with respect to the corresponding function of the control knob and the unit immediately takes over the last value as the initial manual setting. Starting from such value, the indicators follow in advantageous local correlation to their adjusting means partially without noticeable time lag in the form of a nominal value indicator. If, by actuating the automatic switch-on particularly in the form of pushbutton 5, the mode is reversed back to automatic, the respective values are controlled by the automatic system according to its preset program. The indicators move to new values specific to the automatic system and indicate the value controlled by the automatic system, as an actual value display.

Figure 2:
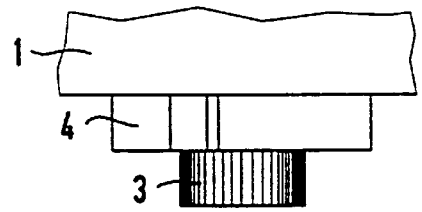
FIG. 2 shows a cutout of the top view of the control unit according to FIG. 1.
Figure 3:
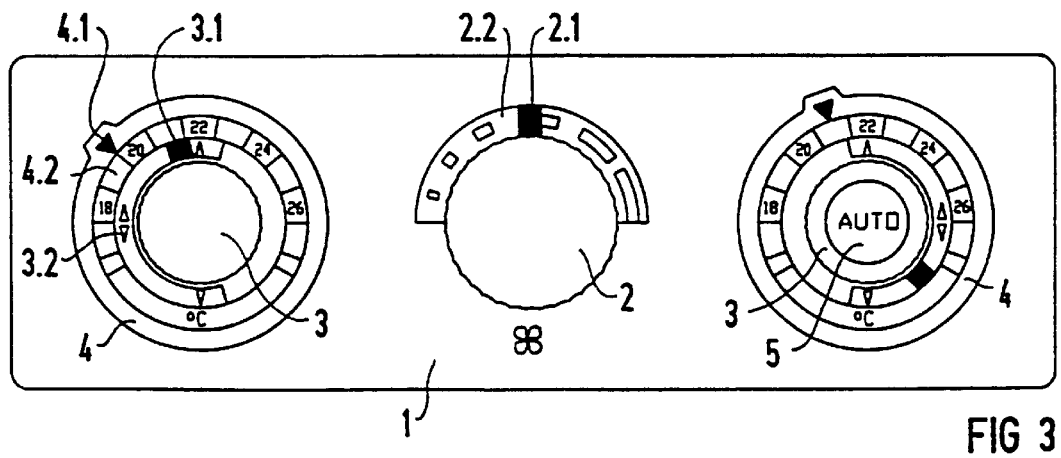
FIG. 3 shows the face plate of a second embodiment of a control unit according to the invention.
Figure 4:
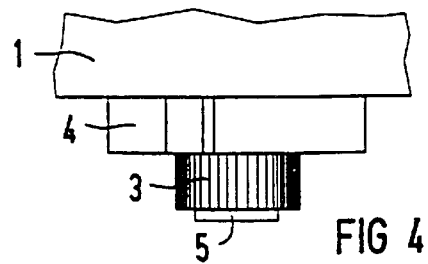
FIG. 4 shows a cutout of the top view of the control unit according to FIG. 3.
Figure 5:
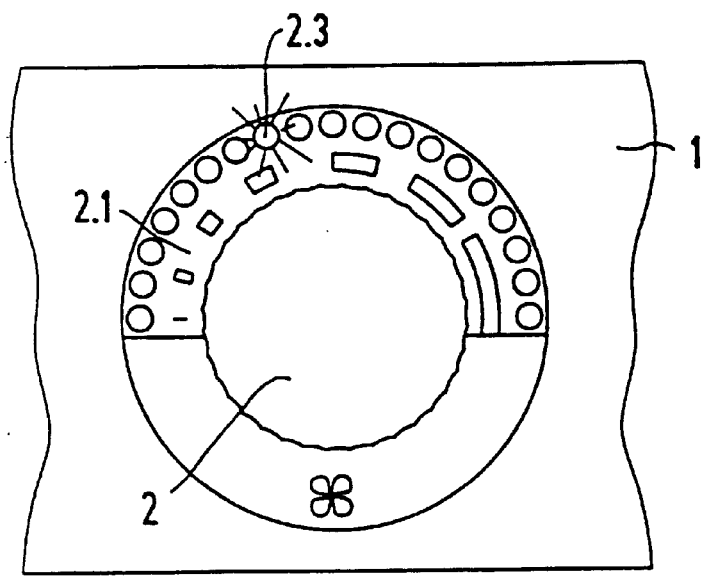
FIG. 5 shows a first cutout of the top view of the control unit according to FIGS. 1, 2, with an LED-display for adjusting the "air volume"
Figure 6:
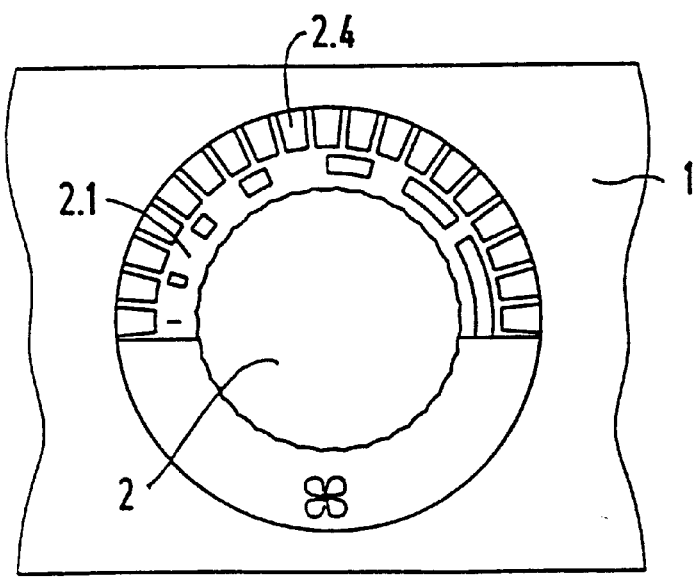
FIG. 6 shows a second cutout of the top view of the control unit according to FIGS. 1, 2, with an LCD-checker board display for adjusting the "air volume".

As particularly shown in FIGS. 2 and 4, the setting and displaying means arranged concentrically to the same axis or shaft are at least partly designed with different axial planes of actuation, in such a way that they can be easily identified and handled when gripped for manual actuation.

Instead of the mechanical indicators 2.1 and 3.1 for "air volume" and "air distribution" according to FIG. 1, provision is made according to special refinements of the invention illustrated in FIG. 4 for indicators in the form of light-emitting diodes 2.3 and LCD-fields 2.4, which are switched on or activated depending on the indicator position, such diodes and fields being adjustable corresponding to the given nominal and/or actual values.

As a means for adjusting the temperature, provision is made in each case for a rotary ring 4 for "air temperature", which is rotatably arranged concentrically with control knob 3, and which has an indicator 4.1, the latter being adjustable relative to a stationary temperature scale ring 4.2.

I claim:

1. A control unit for an automatic air-conditioning system for motor vehicles, with adjusting means and indicators at least for air distribution, air volume and air temperature, the automatic air-conditioning system having an automatic mode and a manual mode, the control unit comprising:

a nominal-value adjusting means for at least one of air distribution, air volume and air temperature, where provision is made for a manually adjustable, analog nominal-value adjusting means;

an indicator device for at least one of air distribution, air volume and air temperature, where an analog indicator device is associated with each analog nominal-value adjusting means; and an independent separate analog drive for, in a manual adjustment mode, directly slaving the indicator device in accordance with a preset nominal value as the nominal-value indicator device and for, in an automatic adjustment mode, directly slaving the indicator device in accordance with the given value of at least one of air distribution, air volume and air temperature, as actual-value indicator device.

2. A control unit according to claim 1, wherein at least one control knob acts as a nominal-value adjusting means for air volume or, air distribution or air temperature and the indicator device acts as a nominal-value or actual value indicator of air volume and air distribution, each of the indicator devices slaving concentrically with the control knobs relative to a stationary indicating dial with the help of the separate drive.

3. A control unit according to claim 1, wherein automatic function of the air-conditioning system is dependent for switch-off purposes upon manual actuation of the nominal-value adjusting means for air distribution or air volume, respectively.

4. A control unit according to claim 3, further comprising manually actuated automatic—switch on means, wherein the automatic function of the air-conditioning system, following prior manual actuation of the nominal-value adjusting means, is, dependent for switch-on, upon the manually actuated automatic—switch on means.

5. A control unit according to claim 2, wherein a rotary ring serves as the adjusting means for air temperature, the rotary ring being concentric with the control knobs.

6. A control unit according to claim 5, wherein the rotary ring comprises an outer ring mounted concentrically with the control knob for air distribution.

7. A control unit according to claim 5, wherein an annular indicating dial for air temperature is radially arranged between the rotary ring for air temperature and the control knob for air distribution, with the indicator device for air temperature, associated with the dial on the side of the rotary ring.

8. A control unit according to claim 4, wherein the automatic switch-on means is arranged concentrically with one of the control knobs.

9. A control unit according to claim 8, wherein the adjusting means and the indicator device arranged concentrically with an identical axle or shaft are at least partly configured with different axial planes of actuation.

10. A control unit according to claim 1, wherein the indicator device comprises indicators and switched-on light-emitting diodes and activated LCD-fields associated with indicating dials, set according to the given nominal and actual values.

11. A control unit according to claim 4, wherein a rotary ring serves as the adjusting means for air temperature, the rotary ring being concentric with the control knobs.

12. A control unit according to claim 6, wherein an annular indicating dial for air temperature is radially arranged between the rotary ring for air temperature and the control knob for air distribution, with the indicator device for air temperature, associated with the dial on the side of the rotary ring.

13. A control unit for an air-conditioning system operable in an automatic mode and a manual mode, the control unit comprising:

at least one nominal-value adjusting device for adjusting at least one of air distribution, air volume and air temperature of the air-conditioning system;

at least an indicator associated with each adjusting device; and analog drive for directly driving the indicator to indicate a pre-set nominal value in the manual mode and to indicate an actual value of at least one of air distribution, air volume and air temperature in the automatic mode.

14. The control unit according to claim 13, wherein manual actuation of the adjusting device for at least one of air distribution and air volume switches off the automatic mode.

15. The control unit according to claim 13, further comprising a switch for initiating the automatic mode of the air-conditioning system.

16. The control unit according to claim 15, wherein at least one adjusting device includes a control knob for air distribution and the switch comprises a pushbutton, the pushbutton being arranged concentrically with the control knob.

17. The control unit according to claim 16, wherein the at least one adjusting device further comprises a rotary ring for air temperature, the rotary ring being concentric with the control knob.

18. The control unit according to claim 17, wherein the indicator for temperature comprises an annular indicating dial for air temperature, the dial being radially arranged between the rotary ring and the control knob.

19. The control unit according to claim 13, wherein the adjusting device and the indicator are arranged concentrically with an identical axle or shaft and are arranged with different axial planes of actuation.

20. A control unit for an air-conditioning system operable in an automatic mode and a manual mode, the control unit comprising:

nominal-value adjusting means for adjusting at least one of air distribution, air volume and air-temperature of the air conditioning system;

means, associated with each said adjusting means, for indicating at least one of air distribution, air volume and air temperature; and means for directly driving the indicator to indicate a pre-set nominal value in the manual mode and to indicate an actual value of at least one of air distribution, air volume and air temperature in the automatic mode.

* * * * *